INVENTOR.
WILLIAM AUSTIN BARRETT
BY Kenwood Ross
ATTORNEY

Dec. 24, 1963   W. A. BARRETT   3,115,439
BELT FOR SUCTION BOXES

Filed Dec. 29, 1961   3 Sheets-Sheet 2

INVENTOR.
WILLIAM AUSTIN BARRETT
BY Kenwood Ross
ATTORNEY.

Dec. 24, 1963  W. A. BARRETT  3,115,439
BELT FOR SUCTION BOXES
Filed Dec. 29, 1961  3 Sheets-Sheet 3
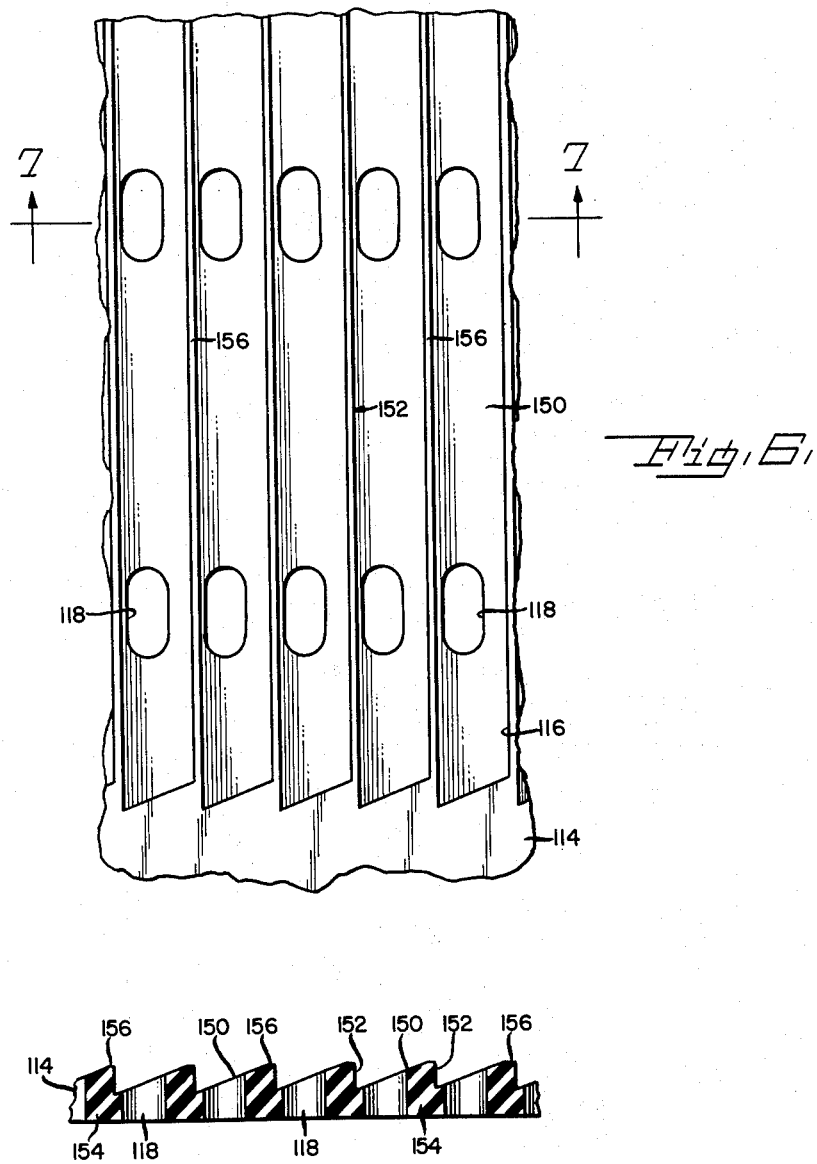
*INVENTOR.*
WILLIAM AUSTIN BARRETT
BY Kenwood Ross
ATTORNEY.

3,115,439
BELT FOR SUCTION BOXES
William Austin Barrett, Nashua, N.H., assignor to W. P.
Evans & Son Ltd., Nashua, N.H., a corporation
Filed Dec. 29, 1961, Ser. No. 163,115
5 Claims. (Cl. 162—367)

This invention relates to papermaking machinery and is more particularly concerned with apparatus for extracting water from a moving paper web.

In known prior art constructions related hereto, the wet web of paper is usually delivered to a travelling wire or felt supported and carried forward by an endless grooved and perforated rubber belt which is driven to pass over and be supported by suction boxes usually in sets of three or more, the vacuum in the boxes drawing the water through the belt and delivering it to a backwater system in manner similar to that used in ordinary suction boxes. A machine constructed in accordance with such principles, while having many desirable characteristics, is also marked by certain defects which become evident during high speed operation. For example, as the speed of the wire is increased, the speed with which the endless belt is revolved is correspondingly increased. Thus, water entrenched in the grooves of the rubber belt is thrown back into the web of paper as the belt leaves the suction box and turns onto the rolls, whereby rewetting of the web of paper occurs.

Again, with grooves having a U-shape and being provided with perforations in the lower wall thereof for extracting water, the spacing between the grooves is such as to leave a comparatively thin vertical strip of rubber between the grooves. As the rubber belt is driven at increased speeds over the suction box by the wire or felt and is held in contact by vacuum, the thin vertical strips or lands of rubber between the grooves tend to transmit the driving force of the belt and distort and vibrate, whereby rapid wear on the belt surface is occasioned with consequent costly replacements.

In contradistinction, I have devised a novel means whereby these difficulties and objections are overcome. I accomplish this by the provision of a device which obviates the possibility of objectionable vibrations in the belt and eliminates the aforesaid objectionable inconveniences.

It is therefore an object of the invention to furnish an improvement in the art which, on the basis of the factors involved, is capable of solving the difficulties involved and assure against objectionable water throwback and unwanted belt wear.

The invention comprehends a particular construction, arrangement, combination, and relationship of the various elements, components and instrumentalities of my novel suction apparatus as exemplified in the following detailed disclosure wherein the objects hereof, as defined in the below paragraphs, will be apparent.

One general object hereof is to provide an improved means for extracting the water from the grooves of an endless belt wherefore throwback is eliminated, thus enabling far greater machine speeds than have been hitherto obtainable.

Same is accomplished by enlarging the suction area so that it extends beyond that point where the belt leaves the wire, thus keeping the under surface of the belt under high vacuum until the upper grooved portion thereof has left its contact with the wire, wherefore any water entrenched in the grooves is drawn into the suction box and will not be thrown back onto the web.

Still a further object is to provide an improved extracting means of the type described which may be readily adapted for use with suction apparatus having two, one or no rolls, all with equal facility.

Another chief object of the invention is to provide an improved design in the grooves of the belt, wherefore the objectionable narrow vertical rubber strip previously described is eliminated whereby the belt construction is greatly strengthened.

More particularly stated, it is a primary object to provide a belt having great strength, while at the same time presenting only a minimum surface area to the wire, thus greatly increasing the effective surface area thereof.

Still another feature worthy of particularly note is the fact that by means of this novel belt design the danger of marking or streaking, the wet web due to insufficient drainage by capillary action is eliminated.

Too, the organization of structure hereof allows for smoother extraction of water by reducing turbulence.

One of the subsidiary objects of the invention is, accordingly, the achievement of these satisfactory results by the use of a simple means of the type above indicated.

Another object is to provide suction apparatus of the above mentioned type that will give smoothness, ease and precision in handling and operation, and that permits of long continued use with minimum of need for repair or maintenance on the part of the user, all resulting in important distinct advantages in economy of manufacture, ease of operation, reliability of performance, and capability of ready assembly to provide positiveness and ease of manual control and action under the varying conditions of practical use.

Other of the chief objects and purposes hereof are to provide advantageous structural and operational features in a device of the class to which reference has been made so as to offer an apparatus having the following inherent meritorious characteristics; first, engineering-wise, a uniqueness in design of coacting parts wherefor the components are coordinated for facile assembly and, when once assembled, are positively and securely retained in operative relationship so as to be not readily separable from each other, accidentally or otherwise; second, a susceptibility to easy installation; third, a high degree of efficiency and dependability in its operational use; fourth, the provision of a construction which is well adapted to withstand the usage to which an endless belt is ordinarily subjected; and fifth, the provision of such other improvements in and relating to suction apparatus of the type above referred to as are hereinafter described and claimed.

Further objects are to provide suction apparatus conformable to the desiderata of the preceding paragraph and offering specific improvements in its various operating instrumentalities, which themselves are minimum in number, so that it is simple and compact in accordance with the demands and desires of manufacturers and purchasers alike and so as to provide distinct advantages in that it is distinctive in its appearance, practical in its value, durable in its organization, reliable in its operation, and efficient in its use.

The objects of the invention are susceptible of attainment by use of constructions different in certain respects from that disclosed, such as minor changes and variations in dimensions, shape, form, proportion, integration, cooperation of material and/or type of subassembly and accessory, all without departing from the underlying principles, salient features, scope and spirit hereof.

While all of these objects are attainable in the preferred and disclosed embodiment, it is to be understood that, by utilizing the invention only in certain of its aspects, certain of the objects may be attained individually or in subgroups without necessarily attaining all of the objects. That is, while the advantages of the invention as here outlined are best realized when all of its features and instrumentalities are combined, useful embodiments may be produced involving less than the whole.

The characteristic features which I consider to be novel with my invention, as to its construction and organization and as to its methods of manufacture and operation, will be better understood from a consideration of the following detailed description forming a part of this specification, when read in conjunction with the illustrations in the accompanying drawings, wherein like characters of reference are employed to designate like or corresponding parts throughout the several views and in which:

FIG. 6 is an enlarged, fragmentary top plan view showing the endless belt of the invention; and FIG. 7 is a sectional view taken on the line 7—7 of FIG. 6.

In the following description and in the appended claims, various components and details thereof will be identified by specific names for purposes of convenience. Although specific terms and expressions are employed for purposes of identifying various components, they are used in a generic and descriptive sense only. The phraseology or terminology herein employed is for the purpose of limitation and they are intended to be as generic in their application as the art will permit. They are not intended to exclude any reasonable equivalents of the features shown and described or portions thereof.

Figure 1:
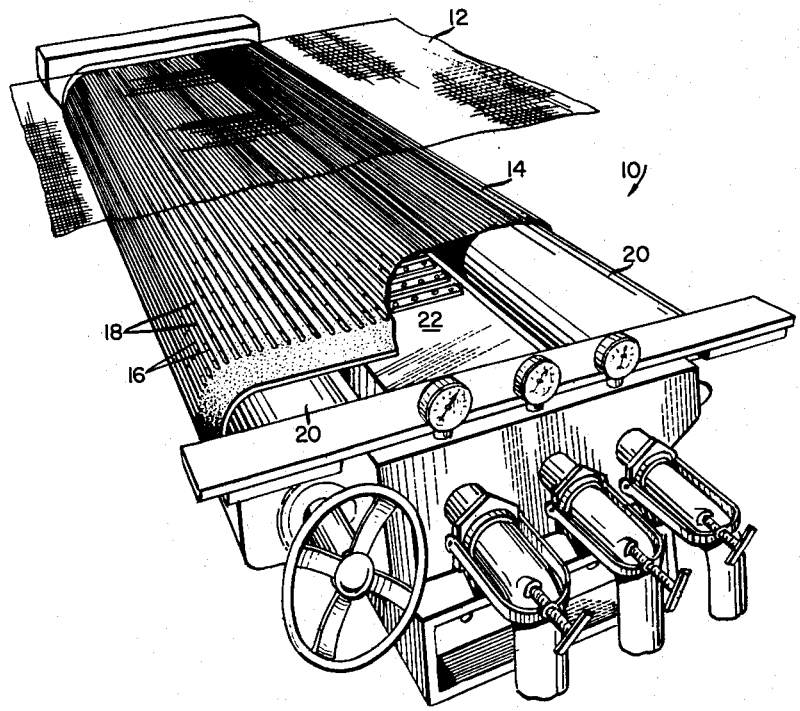
FIG. 1 is a perspective view of suction apparatus showing the relationship of a traveling wire relative thereto.

With continued reference now to the drawings, which illustrate a typical and preferred embodiment of the invention for the purpose of disclosure and form a part of this specification, I have shown in FIG. 1, suction apparatus generally indicated by 10, of the type described in prior United States Patents Nos. 2,039,308, dated May 5, 1936, and 2,601,378, dated June 24, 1952, and comprising generally an endless wire or felt 12 whose operative run is supported upon and carries forward as it travels, a horizontally disposed endless rubber belt 14, the latter being formed with rows of grooves 16 and perforations 18, and being supported by a pair of conveyor rollers 20 mounted in adjustable bearings on the framework of the apparatus, with the rubber belt being driven to pass over and be supported by suction boxes 22, the vacuum in the boxes drawing the water through the belt.

Figure 2:
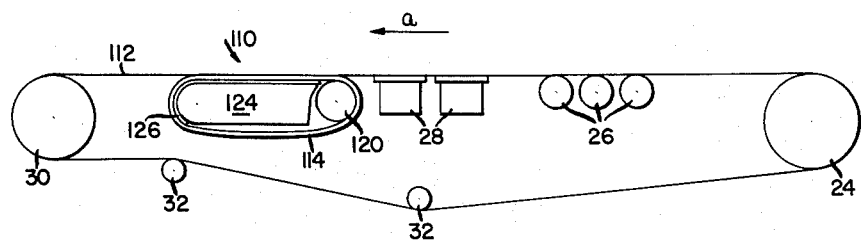
FIG. 2 is a diagrammatic representation of a paper machine embodying suction means formed in accordance with the principles of the invention.

In FIG. 2 of the drawings I have shown, by diagrammatic representation, the positioning of my improved suction apparatus on a paper machine of the Fourdrinier type, the forming wire 112 of which is trained over a breast roll 24, table rolls 26, a pair of wet boxes 28, suction apparatus 110, a couch roll 30 and return rolls 32.

The wire 112, carrying a web thereon, moves from the breast roll in the direction of the arrow a and passes over an endless rubber belt 114 having a plurality of spaced, parallel, longitudinally-extending grooves 116 and perforations 118 provided therein, said rubber belt being disposed between the wire and the suction openings 122 of a suction box 124, and being mounted upon a driven roll 120 and a wear plate 126.

Figure 3:
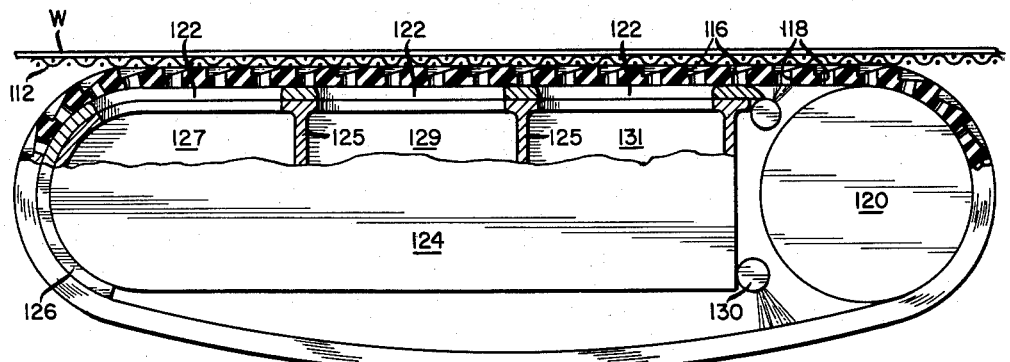
FIG. 3 is an enlarged elevational view of one preferred form of suction box with portions having been broken away for purposes of clarity.

As shown in FIG. 3, the suction box 124 is provided with transversely extending upright partition walls 125 to form separate compartments 127, 129 and 131 within the box, with the suction openings 122 being disposed at the upper end of each compartment.

In the embodiment of the invention shown in FIGS. 2 and 3, the suction opening 122 provided in compartment 127 and disposed adjacent the wear plate has been enlarged to present an increased suction area whereby the endless belt is maintained under high vacuum until it has left its contact with the wire.

As best seen in FIG. 3, the suction opening 122 adjacent wear plate 126 has been extended partially around that portion of the belt which curves around the wear plate 126, whereby the under-surface of the belt is maintained under vacuum until the grooved upper surface thereof has left contact with the wire. By this means, any water entrenched in the grooves 116 of the belt is drawn therefrom into the suction box and will not be thrown back onto the web W.

Spray nozzles 130 may be provided to insure adequate lubrication of the under-surface of the belt wherefore unnecessary wear thereof is precluded.

Figure 4:
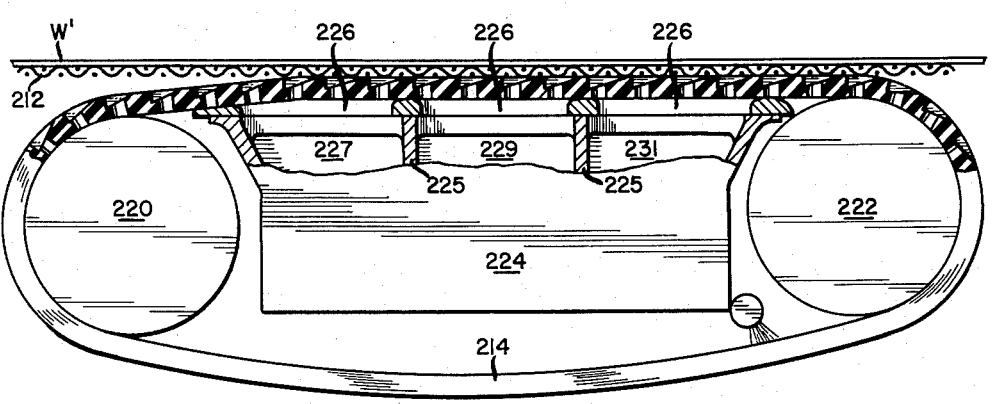
FIGS. 4 and 5 are views similar to FIG. 3 showing modified forms of the suction apparatus of the invention.

In the embodiment shown in FIG. 4, an endless belt 214 carrying a wire 212 and a web W' is mounted upon rolls 220 and 222 having a suction box 224 disposed therebetween, with the suction box being provided with suction openings 226 therein adjacent the belt and wire. The suction box 224 is provided with transversely extending upright partition walls 225 to form separate compartments 227, 229 and 231 within the box, with the suction openings 226 being disposed at the upper end of each compartment.

The opening 226 in compartment 227, which is disposed adjacent the roll 220 is enlarged to present an increased suction area whereby the endless belt is maintained under high vacuum until it has left its contact with the wire.

Figure 5:
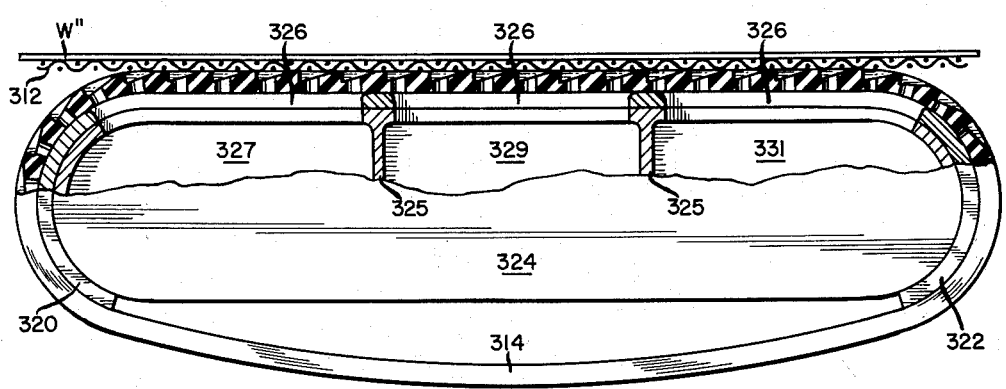

In the embodiment shown in FIG. 5, an endless belt 314, carrying a wire 312 and a web W'' is mounted upon curved wear plates 320 and 322 having a suction box 324 disposed therebetween, with the box being provided with suction openings 326 adjacent the belt and wire. The suction box 324 is provided with transversely extending upright partition walls 325 to form separate compartments 327, 329 and 331 within the box, with the suction openings being disposed at the upper end of each compartment.

The openings 326 in compartments 327 and 331 which are disposed adjacent the wear plates 320 and 322, respectively, are enlarged to present an increased suction area whereby the belt is maintained under high vacuum until it has left its contact with the wire.

FIGS. 6 and 7 of the drawings graphically illustrate the novel sawtooth type groove 116 employed in the endless rubber belt, same being employed rather than the usual U-shaped groove heretobefore employed with suction apparatus of this type, to overcome the objectionable water throwback previously described.

The grooves 116 are characterized by an inclined rearward wall 150 and a vertically disposed forward wall 152, with each of the grooves being separated by lands 154.

Longitudinally spaced perforations 118 are provided in the grooves and extend through the belt wherefore water may be extracted therefrom. While these perforations have been shown as being vertically disposed, they may be slightly inclined, if desired.

By means of this design, only the small upper areas 156 of the rubber belt are in contact with the wire, whereby the effective suction area is greatly increased while at the same time, virtually eliminating any possibility that the wet web of paper may be marked or streaked.

Too, by forming the grooves in this manner, smooth extraction of water may be obtained whereby turbulence is markedly decreased, same being achieved due to the increased strength of the belt.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The protection which is sought for this invention is covered by the language of the above specification and the spirit represented thereby.

The claims are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. In a paper making machine including a traveling forming wire having a paper web disposed thereon and an endless belt engaging the lower surface of the wire and a plurality of grooves in said belt and a suction box within the train of said belt, the improvement in which the area of the suction box in which the openings are located is extended so that the lower surface of the belt is maintained under vacuum until the grooves of the belt no longer contact the traveling wire.

2. In a paper making machine, means for extracting water from a paper web including an endless flexible revolvable belt having grooves and perforations therein and means to support the belt with the belt being adapted to support a wire and the web with the suction box having laterally spaced apertures in its upper surface adjacent the lower surface of the belt, the improvement in which the area of the suction box in which the apertures are located is extended so that the lower surface of the belt is maintained under high vacuum until the grooves of the belt no longer contact the traveling wire.

3. In means for extracting water from a paper web including an endless flexible revolvable belt having grooves and perforations therein, and revolvable means to support the belt with the belt being adapted to support a wire and the web and a suction box having laterally spaced apertures in its upper surface adjacent the lower surface of the belt, the improvement in which the area of the suction box in which the apertures are located is extended so that the lower surface of the belt is maintained under high vacuum until the grooves of the belt no longer contact the traveling wire.

4. In means for extracting water from a paper web and including endless flexible revolvable belt having grooves and perforations therein and means comprising a rotatable member and a fixed member to support the belt with the belt being adapted to support a wire and the web and a suction box having laterally spaced apertures in its upper surface adjacent the lower surface of the belt, the improvement in which the area of the suction box in which the apertures are located is extended so that the lower surface of the belt is maintained under high vacuum until the grooves of the belt no longer contact the traveling wire.

5. In means for extracting water from a paper web and including an endless flexible revolvable belt having grooves and perforations therein and means comprising a pair of fixed members to support the belt with the belt being adapted to support a wire and web, and a suction box having laterally spaced apertures in its upper surface adjacent the lower surface of the belt, the improvement in which the area of the suction box in which the apertures are located is extended so that the lower surface of the belt is maintained under high vacuum until the grooves of the belt no longer contact the traveling wire.

References Cited in the file of this patent

UNITED STATES PATENTS

| | | |
|---|---|---|
| 2,601,378 | Evans | June 24, 1952 |
| 3,013,605 | Justus | Dec. 19, 1961 |
| 3,053,319 | Cronin et al. | Sept. 11, 1962 |